US008719328B2

(12) United States Patent
Giacalone, Jr.

(10) Patent No.: US 8,719,328 B2
(45) Date of Patent: *May 6, 2014

(54) METHOD FOR SCHEDULING DISTRIBUTION OF CONTENT TO A PLURALITY OF MEDIA DEVICES

(75) Inventor: Louis Giacalone, Jr., Las Vegas, NV (US)

(73) Assignee: Bally Gaming, Inc., Las Vegas, NV (US)

(*) Notice: Subject to any disclaimer, the term of this patent is extended or adjusted under 35 U.S.C. 154(b) by 563 days.

This patent is subject to a terminal disclaimer.

(21) Appl. No.: 12/424,365

(22) Filed: Apr. 15, 2009

(65) Prior Publication Data

US 2009/0240721 A1    Sep. 24, 2009

Related U.S. Application Data

(63) Continuation of application No. 11/588,064, filed on Oct. 25, 2006, now Pat. No. 7,523,156, which is a continuation of application No. 09/828,463, filed on Apr. 6, 2001, now Pat. No. 7,228,341.

(60) Provisional application No. 60/195,646, filed on Apr. 7, 2000.

(51) Int. Cl.

| G06F 15/16 | (2006.01) |
|---|---|
| G06F 15/173 | (2006.01) |
| G06F 15/177 | (2006.01) |
| G06Q 30/02 | (2012.01) |
| H04H 60/06 | (2008.01) |
| H04N 21/414 | (2011.01) |
| H04L 29/08 | (2006.01) |
| H04H 60/64 | (2008.01) |

(52) U.S. Cl.
CPC ............ *G06Q 30/02* (2013.01); *H04H 60/06* (2013.01); *H04N 21/41415* (2013.01); *H04L 67/325* (2013.01); *H04H 60/64* (2013.01); *G06Q 30/0264* (2013.01)
USPC ............ 709/201; 709/218; 709/231; 709/244

(58) Field of Classification Search
CPC ... G06Q 30/02; G06Q 30/0264; H04H 60/06; H04H 60/64; H04N 21/41415; H04N 7/165; H04L 67/325
USPC .................. 709/201, 217–228, 231, 244
See application file for complete search history.

(56) References Cited

U.S. PATENT DOCUMENTS

| 5,392,066 A | 2/1995 | Fisher et al. |
|---|---|---|
| 5,421,031 A | 5/1995 | De Bey |

(Continued)

*Primary Examiner* — Haresh N Patel
(74) *Attorney, Agent, or Firm* — Brooke Quist; Marvin Hein

(57) ABSTRACT

Methods of electronic scheduling for playback of media contents. Discrete items of content are scheduled for play back based upon a schedule created by the integration of five standard scheduling methods into a single scheduling algorithm. In the first scheduling method, a discrete item of content is assigned a frequency rating relative to other items of content. A second way to schedule is repeating a content item at specific intervals of time. A third scheduling method allows the content to be played at a specific date and time. The fourth scheduling method includes playing a content item upon receipt of a trigger event which is received from a source external to the scheduling system. And lastly, means are provided for selectively determining whether or not particular content is available for play in a particular venue or during a particular period of time.

19 Claims, 16 Drawing Sheets

(56) References Cited

U.S. PATENT DOCUMENTS

| | | |
|---|---|---|
| 5,453,987 A | 9/1995 | Tran |
| 5,740,549 A | 4/1998 | Reilly et al. |
| 5,758,257 A | 5/1998 | Herz et al. |
| 5,802,062 A | 9/1998 | Gehani et al. |
| 5,823,879 A | 10/1998 | Goldberg et al. |
| 5,842,010 A | 11/1998 | Jain et al. |
| 5,848,397 A | 12/1998 | Marsh et al. |
| 5,861,881 A | 1/1999 | Freeman et al. |
| 5,881,245 A | 3/1999 | Thompson |
| 5,930,252 A | 7/1999 | Aaker et al. |
| 5,937,392 A | 8/1999 | Alberts |
| 6,009,409 A | 12/1999 | Adler et al. |
| 6,029,195 A | 2/2000 | Herz |
| 6,036,601 A | 3/2000 | Heckel |
| 6,038,545 A | 3/2000 | Mandeberg et al. |
| 6,049,332 A | 4/2000 | Boetje et al. |
| 6,060,995 A | 5/2000 | Wicks et al. |
| 6,195,694 B1 | 2/2001 | Chen et al. |
| 6,215,411 B1 | 4/2001 | Gothard |
| 6,286,005 B1 | 9/2001 | Cannon |
| 6,286,029 B1 | 9/2001 | Delph |
| 6,311,165 B1 | 10/2001 | Coutts et al. |
| 6,314,451 B1 * | 11/2001 | Landsman et al. ............ 709/203 |
| 6,317,789 B1 | 11/2001 | Rakavy et al. |
| 6,363,411 B1 * | 3/2002 | Dugan et al. ................ 709/202 |
| 6,446,045 B1 | 9/2002 | Stone et al. |
| 6,477,707 B1 | 11/2002 | King et al. |
| 6,494,363 B1 | 12/2002 | Roger et al. |
| 6,502,076 B1 | 12/2002 | Smith |
| 6,514,140 B1 | 2/2003 | Storch |
| 6,516,338 B1 * | 2/2003 | Landsman et al. ............ 709/203 |
| 6,516,349 B1 * | 2/2003 | Lieberman ................... 709/225 |
| 6,519,693 B1 | 2/2003 | Debey |
| 6,529,572 B1 | 3/2003 | Rasanen |
| 6,587,127 B1 * | 7/2003 | Leeke et al. ................. 715/765 |
| 6,714,545 B1 | 3/2004 | Hugenberg et al. |
| 6,714,975 B1 | 3/2004 | Aggarwal et al. |
| 6,725,460 B1 | 4/2004 | Nishiyama et al. |
| 6,772,209 B1 * | 8/2004 | Chernock et al. ............ 709/225 |
| 6,816,909 B1 * | 11/2004 | Chang et al. ................. 709/231 |
| 6,834,308 B1 * | 12/2004 | Ikezoye et al. ............... 709/231 |
| 6,876,974 B1 | 4/2005 | Marsh et al. |
| 6,883,000 B1 * | 4/2005 | Gropper |
| 6,963,910 B1 | 11/2005 | Belknap et al. |
| 7,136,906 B2 | 11/2006 | Giacalone, Jr. |
| 7,165,041 B1 | 1/2007 | Guheen et al. |
| 7,228,341 B2 * | 6/2007 | Giacalone, Jr. ............... 709/218 |
| 7,523,156 B2 * | 4/2009 | Giacalone, Jr. ............... 709/201 |
| 7,610,597 B1 * | 10/2009 | Johnson et al. ................. 725/32 |
| 2001/0005855 A1 | 6/2001 | Shaw et al. |
| 2001/0020236 A1 | 9/2001 | Cannon |
| 2001/0032122 A1 | 10/2001 | Hankla |
| 2001/0034643 A1 | 10/2001 | Acres |
| 2001/0042249 A1 | 11/2001 | Knepper et al. |
| 2002/0016776 A1 | 2/2002 | Chu et al. |
| 2002/0019831 A1 | 2/2002 | Wade |
| 2002/0056121 A1 | 5/2002 | Ledbetter |
| 2002/0092017 A1 | 7/2002 | Klosterman et al. |
| 2002/0112925 A1 | 8/2002 | DiFranza et al. |
| 2002/0165776 A1 | 11/2002 | Hunter |
| 2003/0046165 A1 | 3/2003 | Topel |
| 2003/0055729 A1 | 3/2003 | Bezos et al. |
| 2003/0080999 A1 | 5/2003 | Stone et al. |
| 2003/0103644 A1 | 6/2003 | Klayh |
| 2003/0145323 A1 | 7/2003 | Hendricks et al. |
| 2003/0149601 A1 | 8/2003 | Cabral |
| 2003/0200128 A1 | 10/2003 | Doherty |
| 2004/0064497 A1 | 4/2004 | Debey |
| 2004/0095339 A1 | 5/2004 | Gothard |
| 2004/0172655 A1 | 9/2004 | Nishiyama et al. |
| 2005/0188400 A1 | 8/2005 | Topel |
| 2005/0283796 A1 | 12/2005 | Flickinger |
| 2008/0022293 A1 | 1/2008 | Motoyama et al. |

\* cited by examiner

| Scheduling Info | | | | |
|---|---|---|---|---|
| Name: ADSP-INT-001-13 Anniversary ADSP-INT-001-11 H | | Edit Content... | | OK |
| Scheduling Type: Recurring ▽ —166 | | | | Cancel |

Interval 15 min ▽ —168   Enabling Variable: <none> ▽

Offset 5 ⇳   ☐ Interrupt Playing Content
—170   172—

```
              MIDNIGHT       AM          NOON          PM        MIDNIGHT
              12 1 2 3 4 5 6 7 8 9 10 11 12 1 2 3 4 5 6 7 8 9 10 11
   Monday     □□□□□□□□□□□□□□□□□□□□□□□□
   Tuesday    □□□□□□□□□□□□□□□□□□□□□□□□
 Wednesday    □□□□□□□□□□□□□□□□□□□□□□□□
  Thursday    □□□□□□□□□□□□□□□□□□□□□□□□
    Friday    □□□□□□□□□□□□□□□□□□□□□□□□
  Saturday    □□□□□□□□□□□□□□□□□□□□□□□□
    Sunday    □□□□□□□□□□□□□□□□□□□□□□□□
```

[ Select Entire Week ]   [ Deselect Entire Week ]

Becomes Active
◉ Immediately   ○   Friday   March 29, 2001 ▽   12:00:00 AM ⇳

Expires
◉ Never   ○   Saturday   April 07, 2001 ▽   11:59:00 PM ⇳

METHOD FOR SCHEDULING DISTRIBUTION OF CONTENT TO A PLURALITY OF MEDIA DEVICES

CROSS-REFERENCE TO RELATED APPLICATIONS

This application is a continuation of U.S. patent application Ser. No. 11/588,064, filed Oct. 25, 2006, now U.S. Pat. No. 7,523,156, entitled, "Method and System for Electronic Scheduling for Playback Media Contents" which is a continuation of U.S. patent application Ser. No. 09/828,463, filed Apr. 6, 2001, now U.S. Pat. No. 7,228,341, entitled "Method and System for Electronically Distributing, Displaying and Controlling Advertising and Other Communicative Media", which claims the benefit of U.S. Provisional Application No. 60/195,646, filed on Apr. 7, 2000, entitled "Method and System for Distributing, Displaying and Controlling Advertising Electronically". This application is also related to U.S. patent application Ser. No. 09/828,257, filed Apr. 6, 2001, now U.S. Pat. No. 7,136,906, entitled "System for Electronically Distributing, Displaying and Controlling Advertising and Other Communicative Media", which are hereby incorporated by reference.

FIELD OF THE INVENTION

The present invention generally relates to media distribution, display and control methods and systems, and more particularly to an improved method and system for scheduling and distributing discrete modules of content (i.e., audio or video or multimedia) and for managing scheduling conflicts that result from the application of multiple scheduling algorithms within a comprehensive scheduling system.

DESCRIPTION OF THE RELATED ART

In scheduling media for play or remote broadcast, current systems utilize simple algorithms to determine the order or sequence of play for any number of discrete items or content. The typical system utilizes a standard FIFO (First in-First out) queuing method to accomplish the sequential play of discrete items such as multimedia advertisements, music or other content for broadcast. Traditional systems require manual intervention in order to accomplish the more complex non-sequential scheduling specific content play, such as triggered events or asynchronous play requests.

Under the current paradigms, manual intervention by a scheduling administrator (or disc jockey in the case of a radio station) is required to alter the existing schedule of play or introduce new content into play. The current paradigms for content scheduling are not adequate for scheduling content that is to be played at multiple geographically dispersed locations.

The advent and proliferation of digital networks, such as the Internet, make it possible to distribute digital multi-media content to any number of media players that may be connected via a high-speed network. The traditional paradigm of manually intervening in the scheduling process at each location, to incorporate content not pre-scheduled in a sequential queue, is not feasible or efficient for a networked system that may control hundreds or even thousands of content players transmitters or broadcasters.

In the case of current systems, where multimedia content is distributed and scheduled from a single controlling server to any number of distributed points of play, the administrative overhead to manually intervene and insert previously unscheduled content for play would be costly and time consuming.

Existing scheduling systems that accommodate a subset of scheduling algorithms significantly limit the flexibility required for a large networked system of geographically dispersed media players.

SUMMARY OF THE INVENTION

It is therefore an object of the present invention to provide a method for enabling the automated scheduling of media to be played on a logical group of players connected via a distributed network.

Another object of the present invention to provide several methods of scheduling that combine to create a comprehensive and flexible media scheduling system.

Briefly, a presently preferred embodiment of the present provides a method for facilitating the electronic distribution and scheduling for transmission or playback of a variety of communicative media including music, graphics, photographic compositions, audio and/or video content. In the described system, discrete items of content are scheduled for play back based upon a schedule created by the integration of four standard scheduling methods into a single comprehensive scheduling algorithm. In the first scheduling method a discrete item of content is assigned a frequency rating relative to other items of content. A second way to schedule is called recurring playback. In the recurring method, a particular item of content is scheduled to repeat at specific intervals of time. Intervals can be in terms of minutes, hours or days. A third scheduling method allows the content to be played according to a time base, that is, media content can be scheduled to play at a specific date and time. The fourth type of input to the scheduling system is a trigger event which is received from a source external to the scheduling system. Upon receiving a trigger event, particular media content will be played. Included among trigger events is a mechanism called asynchronous request relating to play of previously unscheduled content on an external request basis. A fifth type of input is called category filtering and relates to a characterization qualification, or determination as to whether or not particular content is in some way restricted as to its availability for play in a particular venue. The current invention incorporates these five methods of scheduling playback of content in a single comprehensive scheduling system.

More concisely stated, the present invention supports the following scheduling methods:
1. The assignment of a relative frequency of play method;
2. A recurring interval method;
3. A specified time of play method (time base);
4. An external event or condition trigger; and
5. Category filtering.

An important advantage of the present invention is that it combines all five algorithms into a single system to provide the flexibility required in a networked system containing multiple media players.

Another advantage of the present invention is that it automates the introduction of previously non-scheduled media play based upon an external event and/or request.

Another advantage of the present invention is that it automates the distribution of scheduling changes and/or interrupts to the end nodes (media players) of a distributed network in a media playing system.

These and other objects and advantages of the present invention will no doubt become apparent to those skilled in the art, after having read the following detailed description of a preferred embodiment thereof illustrated in the several figures of the drawing.

BRIEF DESCRIPTION OF THE DRAWINGS

FIGS. 11-17 are screen shots used to illustrate an embodiment of the present invention.

DETAILED DESCRIPTION

Generally stated, the present invention relates to a system for distributing, displaying and controlling advertising electronically. A feature thereof is a scheduling algorithm which has massive implications for many applications that are currently on the Internet. This algorithm applies to the provision and control of music or other content on the Internet, as well as to advertising, and display or broadcast of communicative messages or images or any other kind of digital content, in terms of scheduling and playback. It has a wide class of applications.

Still another feature of the present invention relates to the integration of data streams of corporate information, Internet data or other data from other sources into advertising, both as to the content and the scheduling of play rather than having to constantly re-author electronic media to reflect changing business and retail situations. For instance, an advertising system can actually take the data in live and readjust the media that is being played to reflect the current situation in real time. This provides a much more up-to-date advertising capability. An example of this updating feature is the case in which one has a catalog, for instance, that has both pictures and prices. The present invention can seamlessly integrate both the pictures and the prices such that when an item goes on sale, the system can promote that sale using the old pictures but a new sale price, and automatically bring this information to the screen by virtue of a preprogrammed trigger that indicates that the item is on sale. Thus, some routine intervention in the database, be it a corporate skewed database, like in a supermarket where oatmeal is now on sale, this system can in effect say, now I know which items are on sale so I am going to scan through the store inventory and determine that oatmeal is on sale, and automatically advertise the oatmeal at the new sale price. If pictures are available, it can use them; otherwise pictures or graphics can be made available independently.

Figure 1:
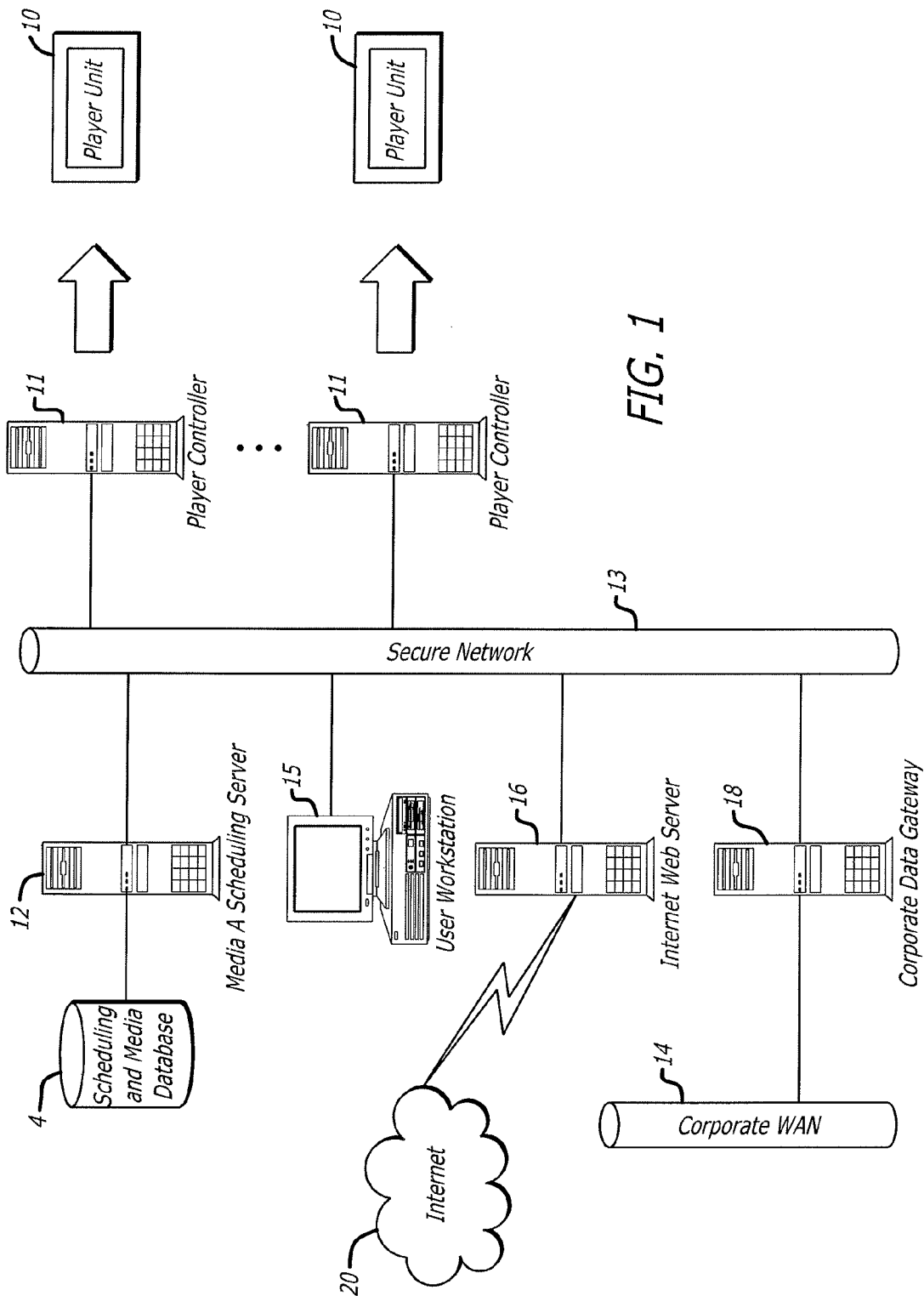
FIG. 1 is a block diagram generally showing a system in which the present invention may be implemented.

Referring now to FIG. 1 of the drawing, an example of system architecture is generally illustrated to include a plurality of media player units 10, each controlled by a player controller 11 that is connected via a high-speed data network to a server 12. Data to be played can be introduced to the data network from a variety of sources including a wide area network 14, a scheduler workstation 15, or from the internet via a web gateway 16. (As used herein the terms "play" and/or "playback" are intended to include any type of display, transmission, broadcast or other dissemination of any type of communicative message, information, data, graphic or photographic content, or other audibly or visually perceivable indicia.)

Both play data and scheduling data can be stored in one or more local or remote databases 4. In accordance with the invention, the individual display, broadcast or player units 10 are standalone devices that are communicably coupled to the system. In the event that communication is interrupted, they can continue to function and await reconnection to the system. Each player 10 and its player controller 11 form a remote player system that can operate as part of the player network (controlled by the server) or in a standalone workstation mode. The server 12 is a central repository for media content and scheduling information, and the server also performs operational monitoring for the overall system. Content and scheduling information for each player controller 11 resides centrally on the server and locally at the controller. As changes are made to either content or scheduling information at the server, the changed data is replicated via a secure network 13 to the player controllers 11. A user workstation 15 is connected via the network to the server and allows changes to be made to data content and scheduling information. Schedule and content information on the server can also be modified by one or more authorized users on the internet via a Web browser interface capable of accessing an internet web server 16.

As illustrated, there can also be a tie between the high-speed data network 13 and a wide area network (WAN) 17, or corporate database, via a data gateway 18, whereby software residing on the server 12 can query the remote databases and bring information into this system. The server can also communicate with other servers on the wide-area network and share information with them. Furthermore, scheduling information can be executed over the wide-area network so as to affect not only many players but many servers associated with many other players.

As suggested above, each of the individual player controllers 11 retain enough information to continuously do its job, whether or not its link to the server 12 is severed, so that upon reconnection it can resynchronize with the system. In the event of the loss of any link within the system, monitoring capabilities are in place such that alerts can be generated indicating the failure of a link for any computer in the network. The system can thus accommodate any maintenance issues that might occur.

In accordance with the present invention, the server 12 maintains the media content to be viewed on one or more of the player units 10. One of the unique features of the invention is that media and scheduling data is replicated between the several system devices so that no data is lost in the event of a failure. Because all information is maintained in several subsystems, following reconnect, the system can synchronize and update all subsystems and/or the server. In operation, data elements stored in the server can be changed either by user interaction or simply as queries against an existing data base that the server then copies to the player controllers.

There is also a certain kind of media content which includes references that are embedded within the information such that at the time the media is played it looks at the copy of the variable that it got from the server and incorporates that information into the play at that time. Thus it is actually using several components of the system together with the scheduler to tell one or more of the player controller stations how to present a particular advertisement. There is, in addition, logic inside the player system that is able to take static image or picture data and incorporate dynamic data into it, or to merge a selection of separate images to achieve a particular result.

Figure 2:
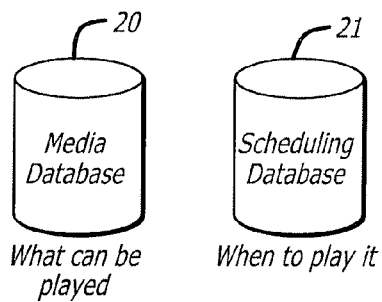
FIGS. 2 and 3 are diagrams suggesting the storage of media and scheduling information in accordance with the present invention.
Figure 3:
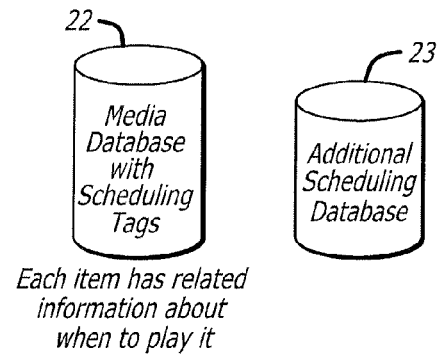

Referring now to FIG. 2 of the drawing. An electronic media database is shown in its simplest form as including separate media database 20 and scheduling database 21. Basically, information contained in database 20 relates to that information which can be played, and data in scheduling database 21 relates to times at which the information can be played. An alternate organizational structure for the data is illustrated in FIG. 3 and may include tagged media stored in a media database 22. This type of media contains both data and information about when the data is to be played. One might think of the database structure in FIG. 2 as being isolated in terms of media and scheduling information, while in the illustration in FIG. 3 (at 22) the scheduling and the media information is unified. As illustrated at 23, additional scheduling information can also be provided to augment the information that is in a particular tag of the data stored in database 22. So basically, there are three possibilities: one where the media and the scheduling information are separate; one where the media and scheduling information is fully unified; and a third which is somewhat of a hybrid approach wherein some of the scheduling information is unified with the media, and additional scheduling information is stored in a separate database.

Generally speaking, the nature of the subject algorithm relates to a concept of determining when particular media is to be played, and more specifically, to a means for providing the capability of determining when particular media is to be played. A feature of the invention is that it includes what is generally referred to as a standard means for playing particular media in response to the assignment of a frequency to each item to be displayed. The item is then played at that frequency relative to other items that are available for play. However, the frequency concept is not absolute. For example, if a particular media player is said to have a frequency of 5, it does not mean that that particular media is going to play five times a minute, or once every five minutes. What it means is that its frequency of play (5) will be relative to that of the other media. That is to say that if a particular item has a frequency of five, and another item also has a frequency of five, they will both play about the same number of times. However, if one has a frequency of five, and another has a frequency of 10, on the average the first will play once for each two plays of the other.

A second way to schedule play is called "recurring", which is to say that a particular play event is specifically intended to occur at a recurring interval. The interval can be in terms of minutes, or hours, or even days. In addition to the interval, an offset to the interval is provided to permit phasing within a particular interval. For example, if one wants to play a particular item every ten minutes, except that he wants it to play at five minutes after the hour, the offset facilitates such play.

The third mechanism is called "time base". In this instance, play is scheduled to occur at a particular time of day. For example, at exactly 5:00 p.m.

The fourth alternative is called "Trigger". In this case some type of signal external to the algorithm is input and typically relates to some type of triggering event. Upon occurrence of the triggering event, a particular media content will be played. A subset of the fourth method is an external asynchronous request to play content. It relates to the unscheduled play of content, perhaps on request.

The essence of the present invention is that it includes subsystems that can do certain things. This is the first media play system that brings a number of alternative play algorithms together. There are basically two aspects to the present invention; (1) the way in which standard scheduling is accomplished, and (2) the holistic ability to have complete scheduling capability. In practicing the present invention one can schedule a wide variety of tasks and media playback as opposed to a certain type of schedule classification. The steps involved in practicing the present invention are illustrated in FIGS. 4-17 and will now be discussed in detail.

A large part of the present invention centers around the fact that the several concepts mentioned above co-exist. There are other systems that have been able to do certain aspects of this invention in discreet form, but no such system has the ability to do all of this in a holistic mode in which one can create a scheduling database that applies to any group of content and have it take care of all of the scheduling needs of a particular output channel.

Figure 4:
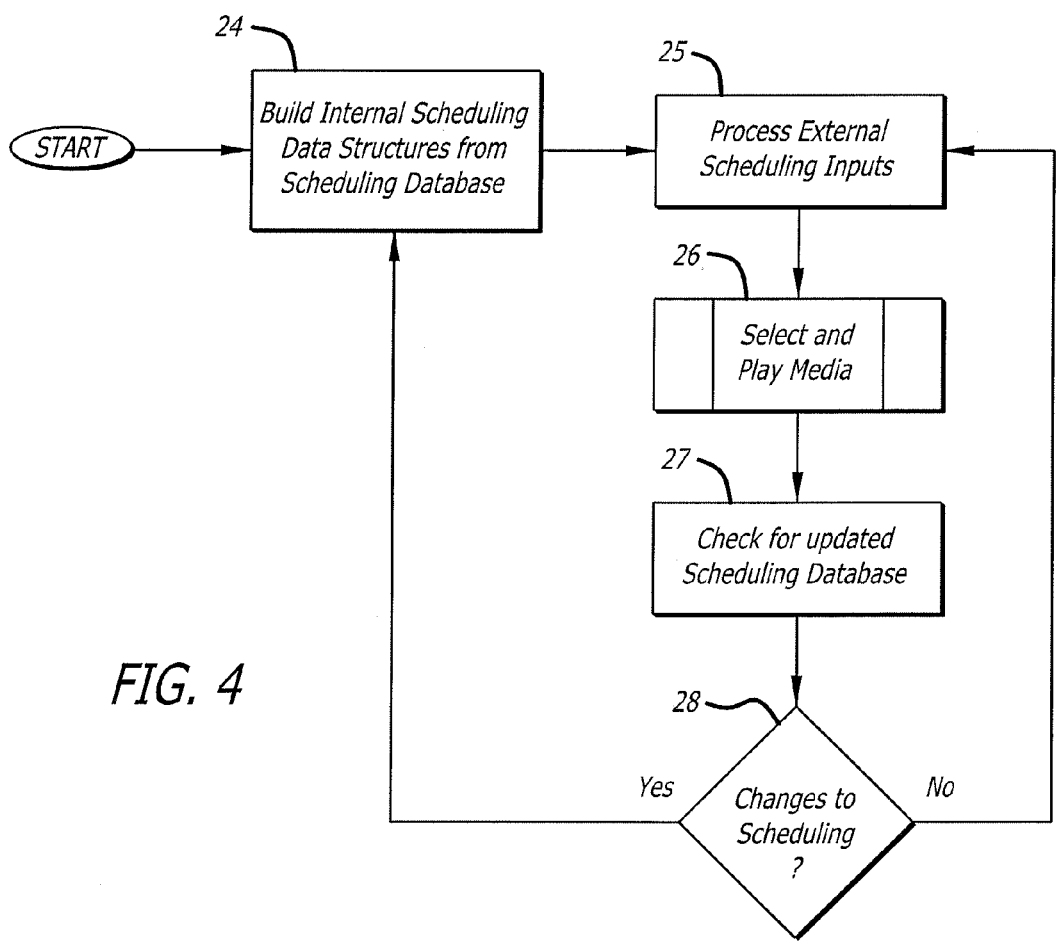
FIGS. 4-10 are flow diagrams illustrating various aspects of the present invention.

Referring now to the initialization diagram illustrated in FIG. 4 of the drawing, the basic flow is depicted during system initialization. As illustrated by block 24, the internal scheduling data structure is built from a scheduling database that can either be in the form of a separate 'scheduling database' or a 'tagged database' with embedded scheduling information as illustrated in FIGS. 2 and 3. The outer loop of the algorithm is the first to "start up." Its function is to process external scheduling inputs i.e., things that deal with asynchronous requests. At this point, the system looks to see if there are any asynchronous requests, such as "play now" kinds of inputs, for example. The main core of the routine is represented by Block 26 designated "select and play media." After the selected media is played, a check is made (27, 28) for updates to the scheduling database to see if any of the control inputs have changed. If there are changes, the database is rebuilt and operation continues. If there are no changes, the system again looks for external inputs, figures out what to play, plays it, and then continues to look for control level changes. If there are no control level changes, the select and play media (block 26) again functions to process the non-interrupting, non-standard items in a manner which will be further described below with respect to FIG. 5.

Non-standard items have an attribute indicating that they are interrupting or non-interrupting; for example, something that is time-based. When an item is scheduled to play at 5:00, it can be interrupting or non-interrupting, meaning that when it is exactly 5 o'clock, no matter what the system is doing, it will be interrupted to play the item, or it will play the item as soon after 5:00 as it can without interrupting the system operation.

Figure 5:
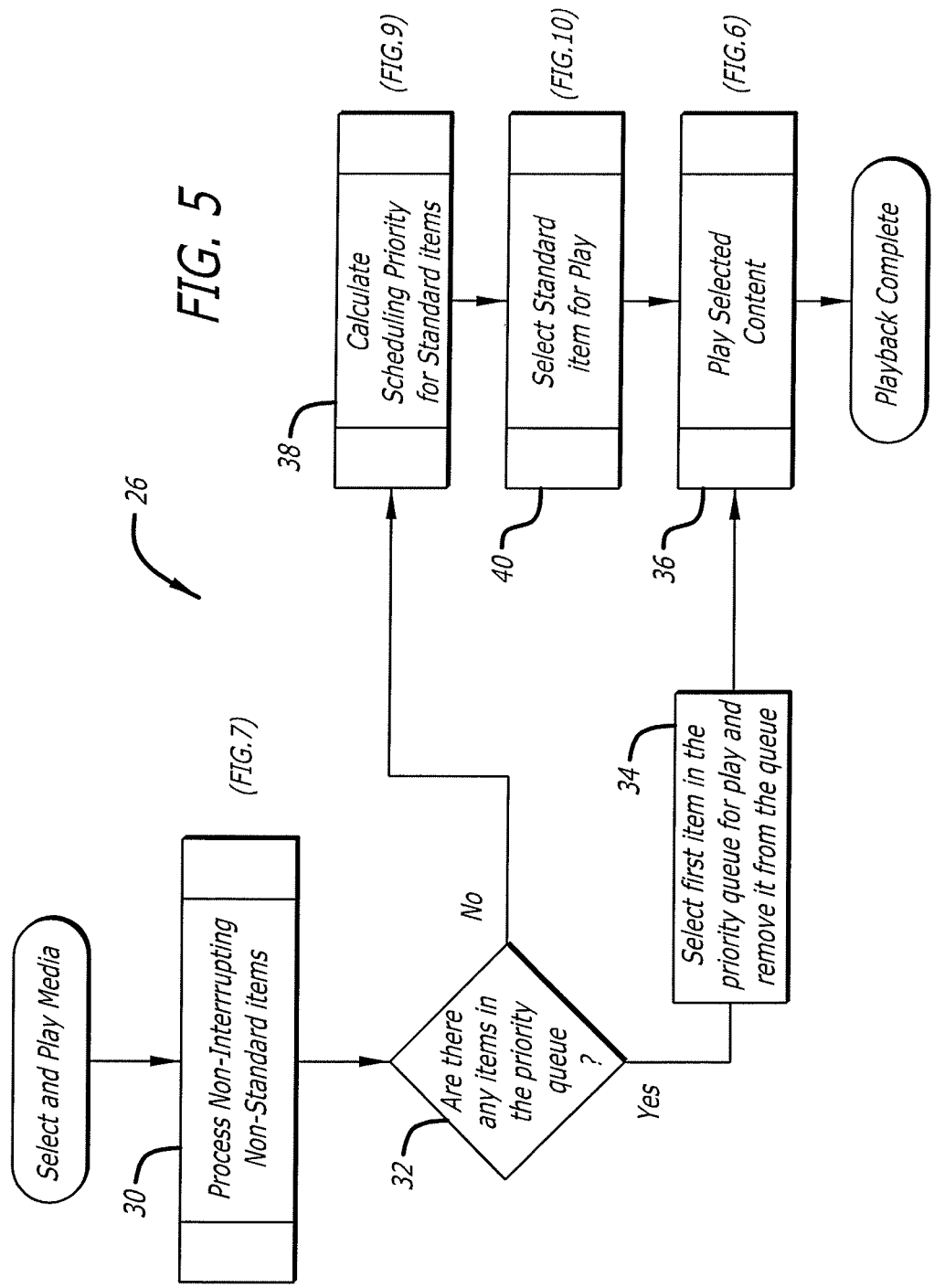

Turning now to FIG. 5 of the drawing, which is a flow diagram illustrating the steps involving carrying out the "select and play media" block 26 previously discussed with relation to FIG. 4, the first step in the main loop is to select and play i.e., process the non-interrupting and non-standard items (Block 30). The algorithm then queries at 32 whether or not there are any items in the priority queue. The priority queue is basically for items that are recurring and time-based, and triggering things that are not interrupting to get played. The system basically makes a list of those things that are not standard and places them in a priority queue to make sure they get played first. So, if there are items in the priority queue, the first item in the queue is selected and played (Block 36), and then removed from the queue. If the test at block 32 indicates that there are no priority items, the scheduling priorities for the standard items are calculated (Block 38), and a standard item is selected for play (Block 40) and that item is played (36), and the cycle is repeated. As an aid to understanding the operation of the present invention one might consider the operation of the system as being analogous to a disk jockey (DJ) radio show. The DJ plays songs, some of which are played more frequently and some of which are played less frequently. And then there are those external events that can happen. For example, someone might make a special request.

A special request is an external event. Another type of external event, although of a different character, is that the station will have to play a station ID tag every 15 minutes to comply with FCC regulations. So if one thinks of the station ID tag as a recurring item that is set to play every 15 minutes, and thinks of a request as being an asynchronous external request, this system acts as a sort of master synchronizing functionary similar to the DJ at a radio station. Basically, the operation goes through the loop checking to see if there are any of the external requests, and if so, processing them (36) as needed. In the main loop, the system is also checking to see if there are any non-standard items, items recurring on a time base, or items that are of a little higher priority overall. If such items are present, then the system takes care of them as per Block 34, then, when those items are cleared, the system returns back to business as usual, playing a mix of normal standard items, as per the select function at Block 40.

Figure 6:
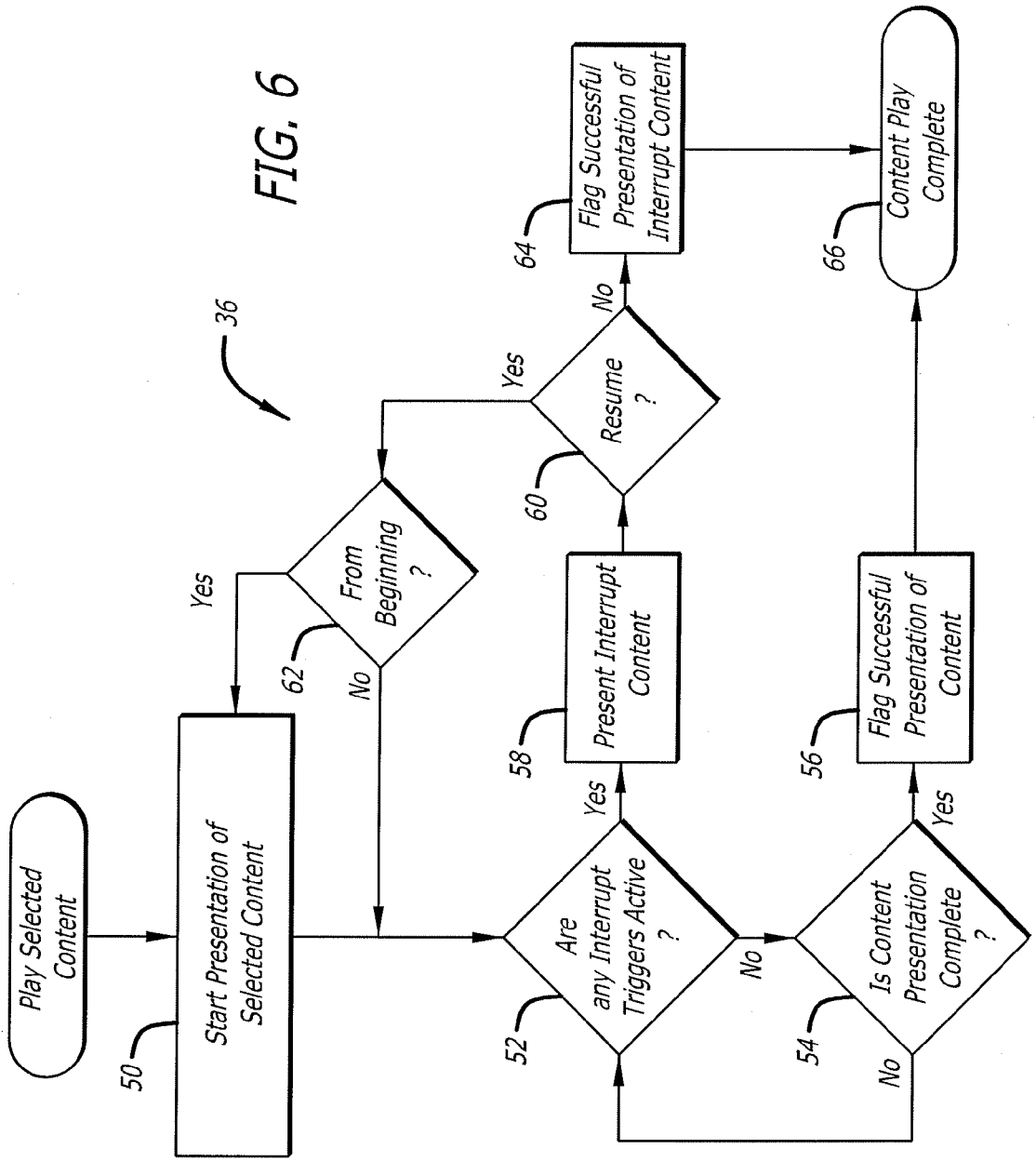

The play selected content function (36) is illustrated in detail in FIG. 6, and is somewhat more complicated than one would normally expect because the system must take care of the situation where interruptions are occurring. Even while material is being played, the system must be aware of the fact that interrupts can be present, so as it begins the presentation of selected content (Block 50) it looks to see (block 52) if there are any interrupt triggers active. If the answer is "no", then it just looks to see (block 54) if the content presentation is complete; if not, it keeps going back to step 52 and sits on idle. As soon as play is complete, the successful completion of content presentation (block 52) is flagged and operation continues. In the event there is an interrupt, the system immediately presents the interrupt content (block 58), and if the content had a specification to resume (block 60) an item that had previously been interrupted, a choice is presented (block 62) of either resuming from the beginning, in which case the previously started presentation is restarted (block 50) or simply continuing (block 52), and if it is not set to resume, the system will flag the completion of the interrupt (block 64) and resume operations (block 66). So this is how the play is accomplished while still preserving the ability to have interrupt capability.

Figure 7:
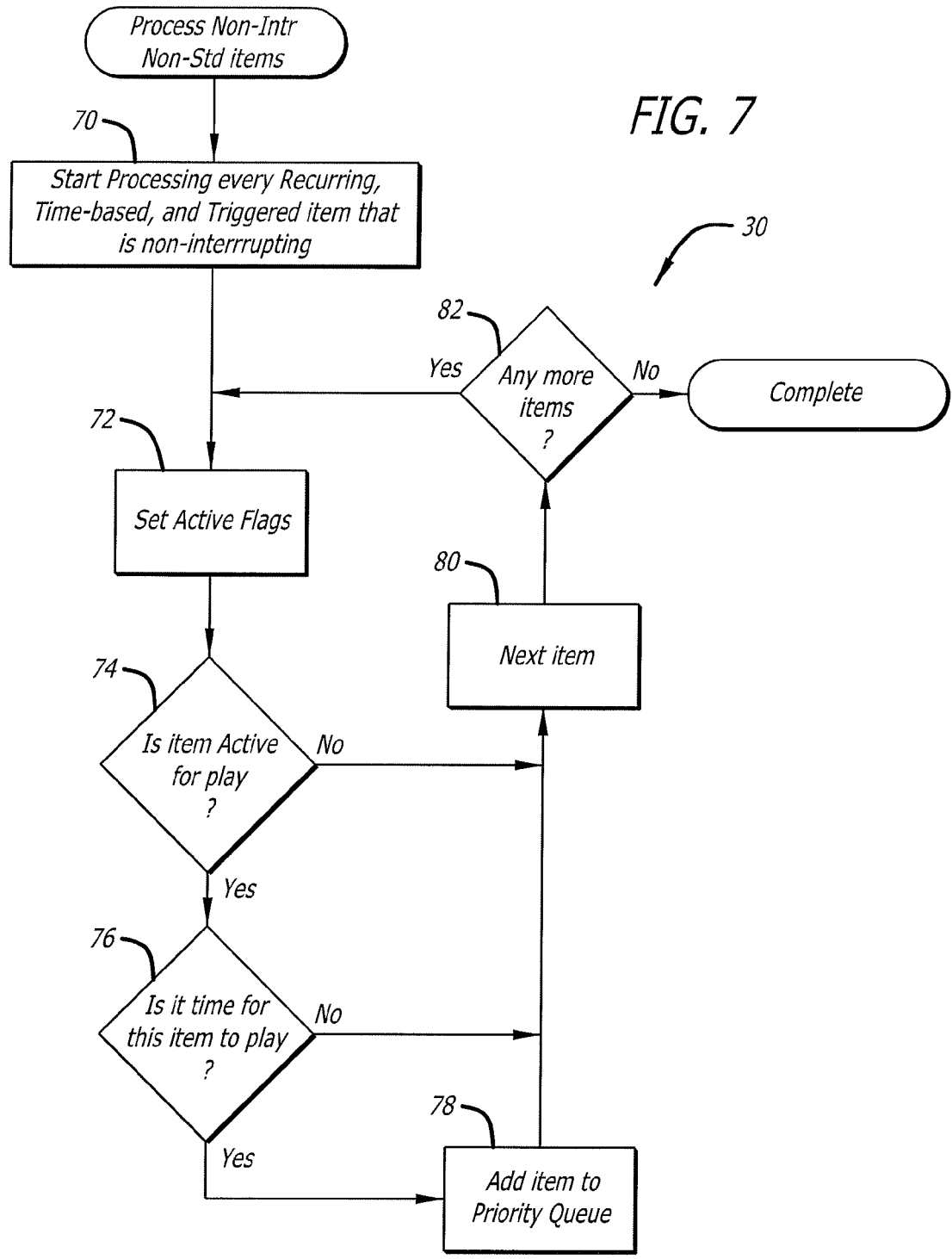

The processing of non-interrupting items (block 30 in FIG. 5) is shown in FIG. 7. For each item in the list that is a non-interrupting item, flags are set to active (block 72) to indicate that items are active and available for play, and at other times to indicate that the items are not active (block 74). For instance, an alcohol ad, or something like that, might be available for play in a system running in the south where they don't want such subject matter played on Sunday. The item will thus be flagged so that it is active Monday through Saturday, but not on Sunday. Or perhaps the blue laws may say that no advertisements are to be run between the hours of 2:00 a.m. and 10:00 a.m.

In accordance with the invention, the present system can block out times and dates so that during such periods, such items are simply not active. Once the flags are set, the system queries; "is the item active for play, yes or no?" (block 76). If it is active, "is it time for this item to play?" If it is a recurring item, the system checks to see if it is the appropriate interval and offset for this item. If it is, it then adds the item to the priority queue (block 78). The same function occurs with time-based items. If it is not the appropriate interval and offset for a particular item, the system just plays through the next item (block 80) and iterates the added item (block 78) to the queue (block 82). It thereby builds a queue so that if an item is active and it is it's time to play, it goes on the queue and the function is complete. This is where the operation stood at block 30 in FIG. 5, wherein the queue is built, and a query (block 32) asks whether or not there are any items in the priority queue.

Figure 8:
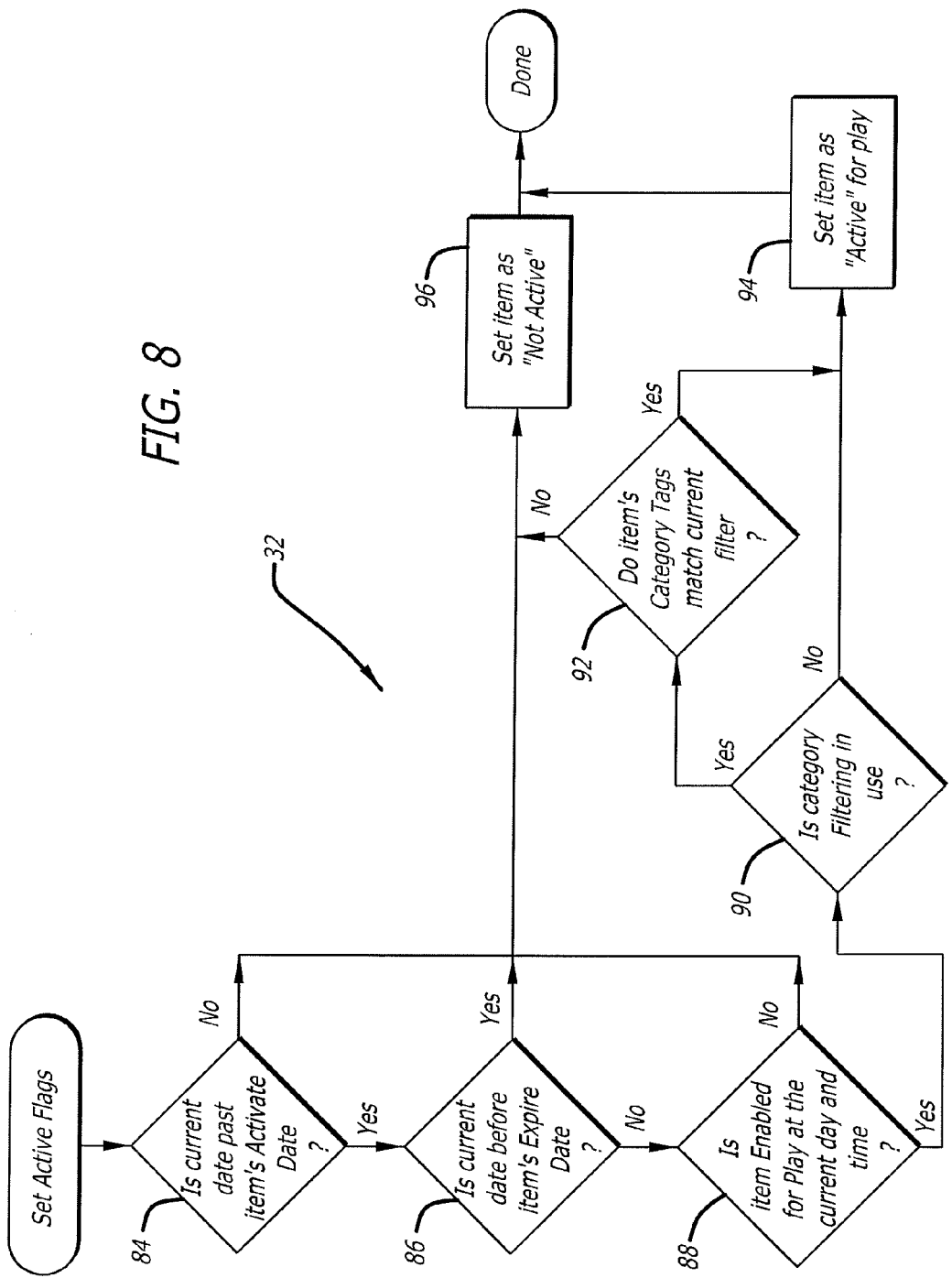
Figure 9:
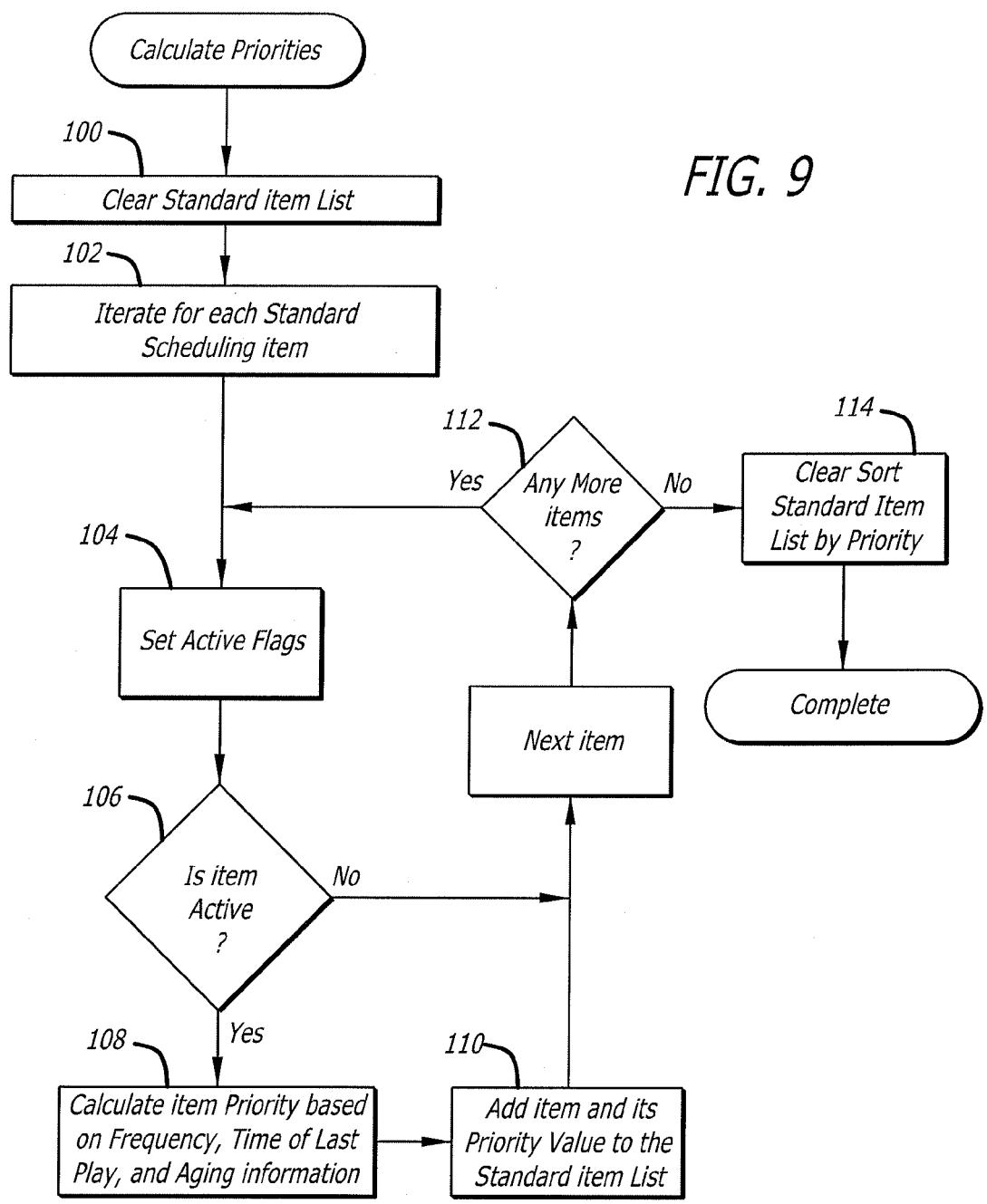
Figure 10:
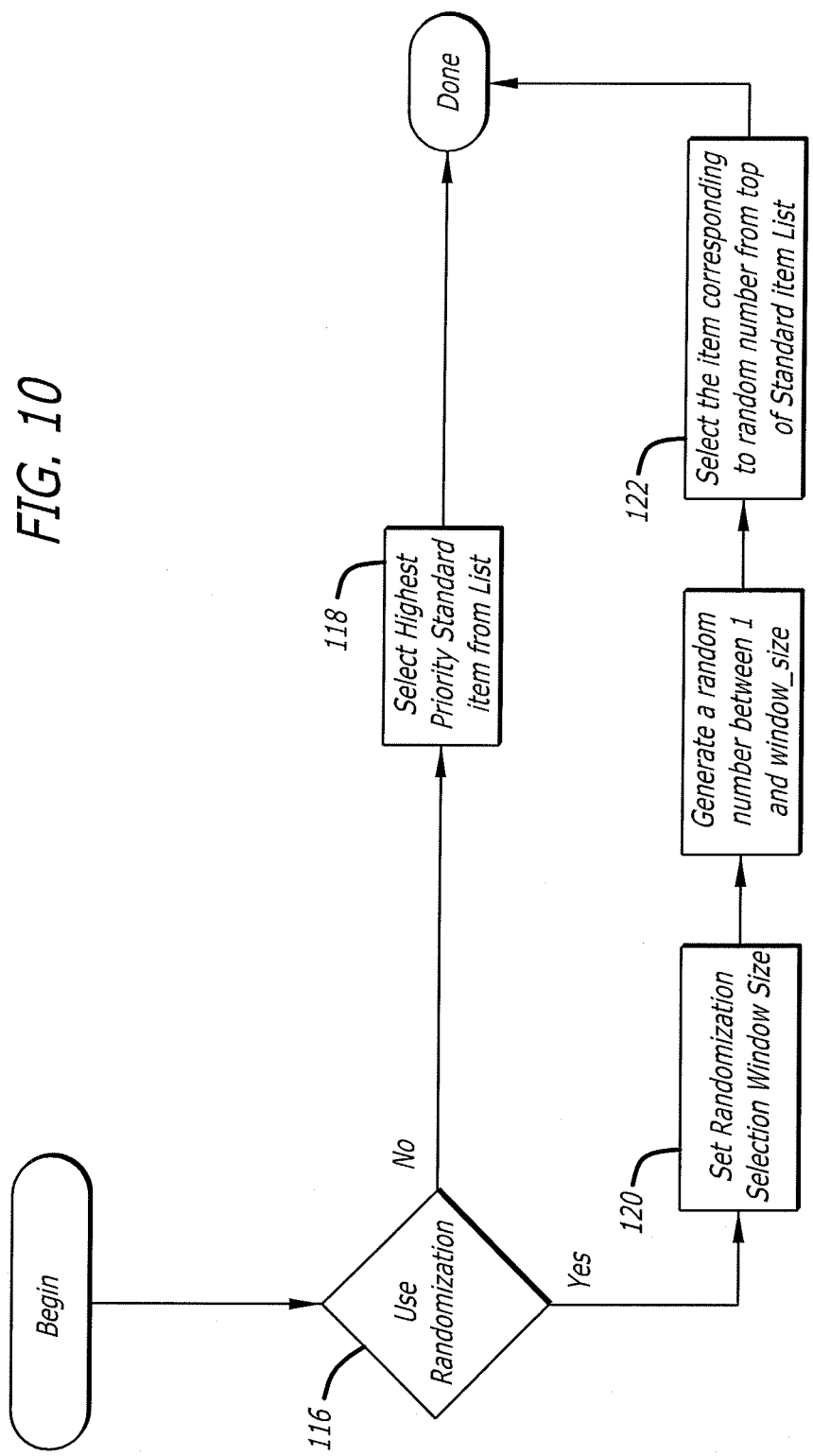

FIG. 8 illustrates the steps involved in the flag setting function (block 32) of FIG. 7. In this function, a couple of detailed parameters are available. One is called an 'activation date', and the other is called an 'expiration date'. An example of these two parameters might be, for example, a promotion for a sale which is to start on Monday, February 5.sup.th, and to end on Friday, February 8.sup.th When such information is input to the system, it sets the activation date and the expiration date. The time will now automatically become available. A query will then be made as to whether or not the item is within the active window. In other words, "has the item passed the activate date" (block 84)? If the answer is yes, then the next query is made; "has the item passed the expiration date" (block 86)? If the answer is no, then a third query is made as to whether or not the item is enabled for play at the current time and date (block 88). Since it is not Sunday, and it's not between the hours of 2:00 and 10:00, the answer will be yes, and the item is enabled. The item is then checked to see if category filtering is in use (block 90), wherein the media can have associated with it either the scheduling database, or through some kind of internal filters (blocks 90,92), tags that in some way restrict play of particular content in particular venues or settings. This is yet another mechanism to determine whether or not an item is available for play. For example, in a casino there are areas that are for the general public, i.e., areas where there are restaurants and movie theatres, etc., and then there are areas where children are not allowed. For example, only adults are allowed in the gambling areas.

A particular advertisement can thus be categorized as "over 21 only," for instance, and can be scheduled for use on all of the displays. However, some displays may have a category filter that says "only 21 and over," and others may have a filter that says "not 21 and over." So when the media comes through with the category flag, it is applied against the category filter (block 92), and if the item matches the current setting of the filter, it is set as "active for play" (block 94). If the item does not match the filter, then the item is set as "inactive for play" (block 96). If any of these things are not true, then the item is not active. If all of these things are true, and the filters match, then the item is active and is allowed to pass through the system and be played. This standard is one of the really unique parts of this invention.

Standard scheduling is exemplified where there are a variety of ad contents to be displayed, and it is desired that certain items be interchanged with other items, and heavier rotation, on the average, is selected for some items, while less frequent rotation is selected for other items. The way in which this is accomplished is that the system generates a "clean list" (see FIG. 9) by clearing a "standard item list" (block 100). This is done every time, because the nature of the algorithm is that it is time-sensitive. So as time moves on, the list changes. The first step is to iterate (block 102) for each standard content item that is in the schedule. Active flags are then set (block 104), and a check (block 106) of the flags is made to see if the item is active. If the item is active, then item priority is calculated (block 108) based on frequency, time of last play and aging information. That item and its calculated priority value are then added to the standard item list (block 110) and the same is repeated for each item. When the determination is made that there are no more items to be added (block 112), the list is sorted according to priority (block 114) and the "select" function (FIG. 10) is commenced.

In implementing the select function, there are two modes that are available, one mode uses randomization (block 116), and a second mode basically selects the highest priority (block 118). So if randomization is called, then the window size is selected and set (block 120) in accordance with the randomization parameters. Basically there are a couple of factors to be considered. One is how many items are on the list, and the other is what percentage of the list is to be eligible for selection randomly. After that, a minimum or a maximum can be applied. For instance, where an operation requires a minimum of two items that it can select between, and even though there might be a large number of items on the list, the system might be set to max out at a particular number of items to randomize between. When one of the top items is selected (block 122) at random from the top "window-size" ad list, that item will be selected and passed as the selected item for play. So this algorithm is at the heart of what this system does and is very special because; not only does it have the capability of characterizing the items for play, such that one item plays more than another item, and yet another plays more than still another item, they have very specific weighting and ratios to the number of times that they are played.

The system also takes into account the time of last play; i.e., the internal scheduling information tracks when these items were played last. If the play is stopped and restarted at a later time, that information can be preserved. So if the database scheduling information is presented, when it starts again the viewer will not hear or see something that he just saw prior to the last time because that information is persistent, i.e., because that information is very special. For instance, if you have a CD player at home and you hit the random button and it just plays items without weighting, and it doesn't know what you heard last, you might hear the same song again, i.e., the first song you hear might be the same song you heard just before you shut the system off. So this feature preserves information about when an item was played, and it uses that intelligently in making the decision on what to be played next.

Furthermore, a common feature of any type of scheduling, whether it be for presentation of music for play, like in the case of a radio station, or for play of promotional or advertising material, is the concept of aging; i.e., as people have seen things, or heard things more and more, one wants to show it to them less because he wants them to see newer things more. This concept of aging allows the system to decrease the relative frequency of play as the material gets older.

There is also a field in the database that indicates when an item was added for play, such that even though a first song might be a "ten," and a second song might be a "ten," the first song is older, so it is not going to be heard as much because its older. Again, that is something that can be parameterized in this system wherein the calculation of the priority takes place. This is also at the heart of the present invention. Means are provided which make intelligent decisions about what material is to be presented, yet at the same time the system maintains all of its flexibility to do the things that are necessary to operate real businesses, be it music or advertising, or even if it is just a matter of entertainment, so that the consumer enjoys a truly entertaining experience in having materials or sound presented to him.

The invention can be applied equally to the play of music, advertising, the viewing of family pictures, multi-media broadcasting, etc. Imagine for example, an automated photo album program in which you have all of your family pictures presented in a selected sequence. Obviously some of the pictures are better than others. You may want to be able to say "show me a particular collection or type of pictures." For example, a slide show can be presented to entertain guests by playing a particular collection of pictures. The system knows which ones of the tagged pictures are better and knows which ones are worse. It also knows which ones have been seen recently. When it pulls one up you might say "Oh my, I haven't seen that one in a while, that was a great one. I remember that vacation." It's the same kind of thing one would want from the experience. So this algorithm captures the essence of what people might want or expect from the media experience, and is able to control the presentation digitally.

Operation of the system can be explained by the following examples. In the first case, one has audio/visual media which is primarily marketing and advertising that has been created, and the creators wish to show it to one or more audiences on one or more devices. So, as was alluded to earlier, a presentation device that is inside a food area might have different requirements for what is to be played by a device that is sitting in the middle of a casino floor, or sitting in the middle of a mall. So what the present invention provides is that it gives a controller the capability of upgrading scheduled items which can incorporate one or more of certain media content items, and then of instructing the system when to play such media items. The controller can thus manually build a list using any of the techniques that were mentioned above and say I want this item to play; I want it to play standard at a frequency of 5. This other item I also want to play standard with a frequency of 5. This alcohol ad I want to play standard with a frequency of 5, except that I don't want it to play on Sundays, and not at certain times of the day. The other items might have been promised to run four times an hour so I want that item to play every 15 minutes using the recurring technique. The happy hour ad, I want it to play at 4:00 p.m. every day, etc.

In operation, the described scheduling system is typically accessed for the purpose of creating or modifying a play schedule in one of two ways. The first method utilizes a windows-based GUI application that directly accesses the content and scheduling database. The second method provides a means for remote users (who are security authorized) to access and manipulate both content and scheduling information utilizing a standard web browser such as Microsoft's Internet Explorer. The web browser connects to a web server that hosts a system manager application specifically designed to access the content and scheduling database. Both methods of scheduling content for play provide the same functionality.

Figure 11:
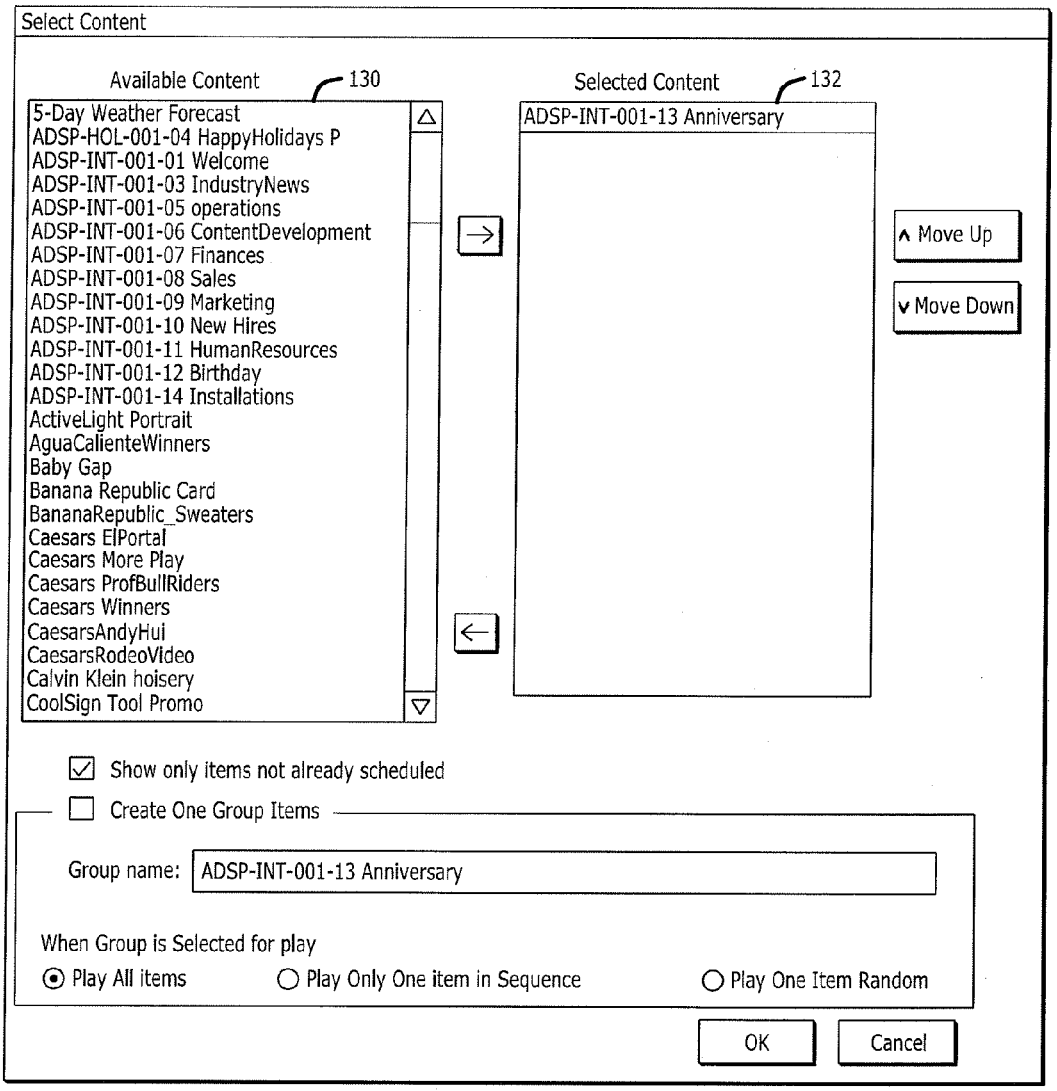

Referring now to the user interface screen illustrated in FIG. 11 of the drawing, the first step in scheduling a piece of content for play requires the user to select the content to be scheduled. The application presents the user with a scroll box containing available content (130) to be scheduled. The user selects from the available content and the selected content is moved to the selected content window (132).

Figure 12:
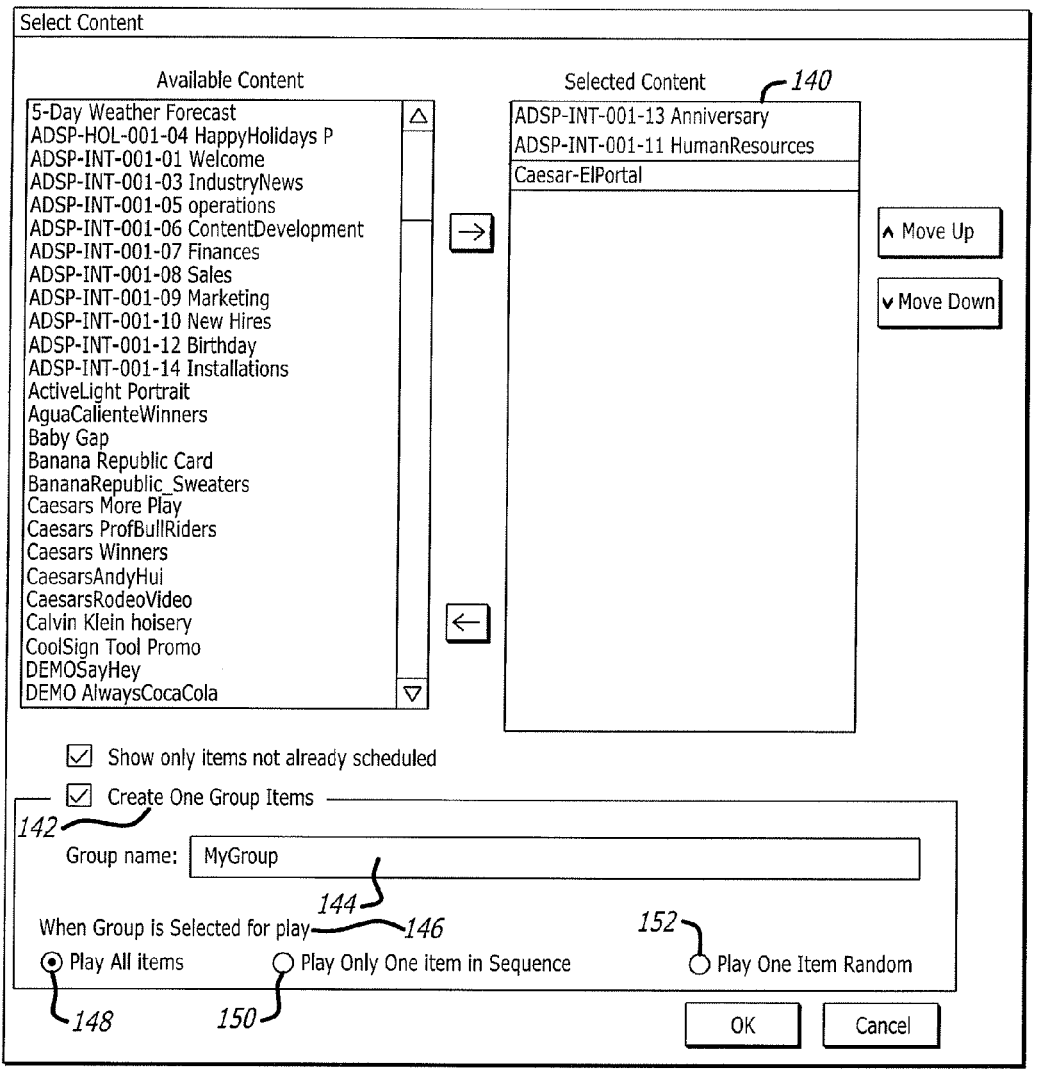

Moving now to FIG. 12, an additional feature of content grouping is presented. The content group function provides a method to group items of content by selecting multiple content items in the select content box (140). The group scheduling function is enabled by selecting the 'create one' group item checkbox (142). Once the group function is enabled, the group must be named by typing in an alphanumeric name for the newly created group (144). A significant benefit of the group function is the ability to select one of three possible play algorithms for each group scheduled (146).

Selecting the "play all items" function (148) causes each item of content contained in the group to be played at each scheduled playing of the selected group. For example, if the group of content was scheduled to be played every hour on the hour, then each item of content in the group (140) would be played sequentially at the top of each hour, e.g., at 1:00 p.m., anniversary would play, followed by Human Resources, followed by Caesar's El Portal. At 2:00 p.m., the sequence would repeat, etc.

Selecting the "play only one item in sequence" button (150) results in one item of content being played for each scheduled play of the group. Using the previous example where the group is scheduled for play every hour on the hour, at 1:00 p.m., anniversary (the first content item in the group) would be played. At 2:00 p.m., Human Resources, the second item of content would be played. At 3:00 p.m., Caesar's El Portal (third item of content) would be played. At 4:00 p.m., the sequence would start over playing the anniversary content item and so forth.

Selection of the "play one item random" button (152) causes any one item of content to be chosen randomly and played once at each scheduled play of the group. Using the same example once again, at 1:00 p.m., one of the three items of content would be selected randomly and played. One of the three content items would again be randomly selected at 2:00 p.m. and again one item randomly at 3:00 p.m., etc.

Figure 13:
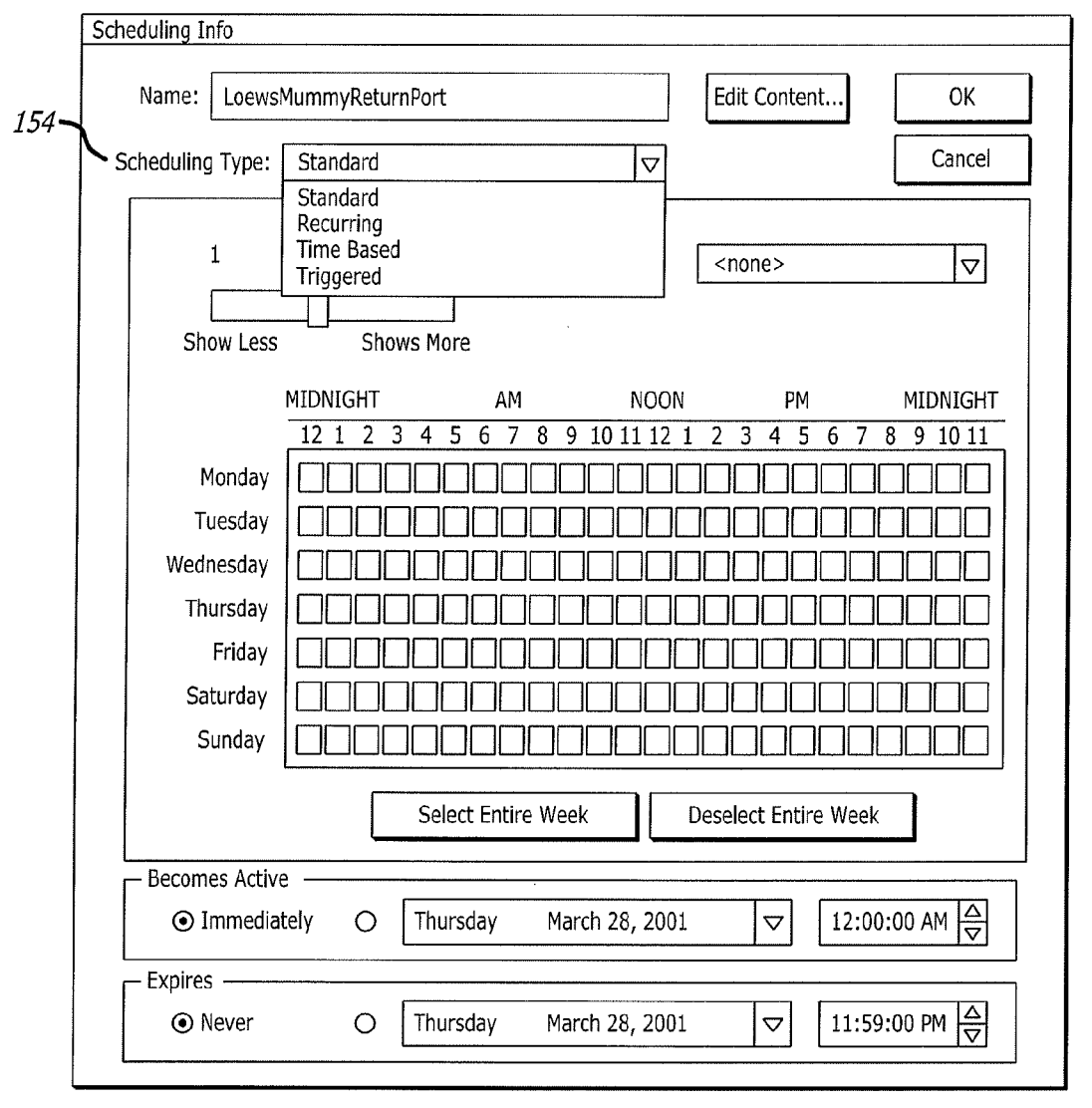

Referring now to FIG. 13, as previously discussed there are four basic types of scheduling supported by the scheduler; standard, recurring, time based and triggered. Selecting a schedule type (154) is the first step once an item of content has been chosen for scheduling.

Figure 14:
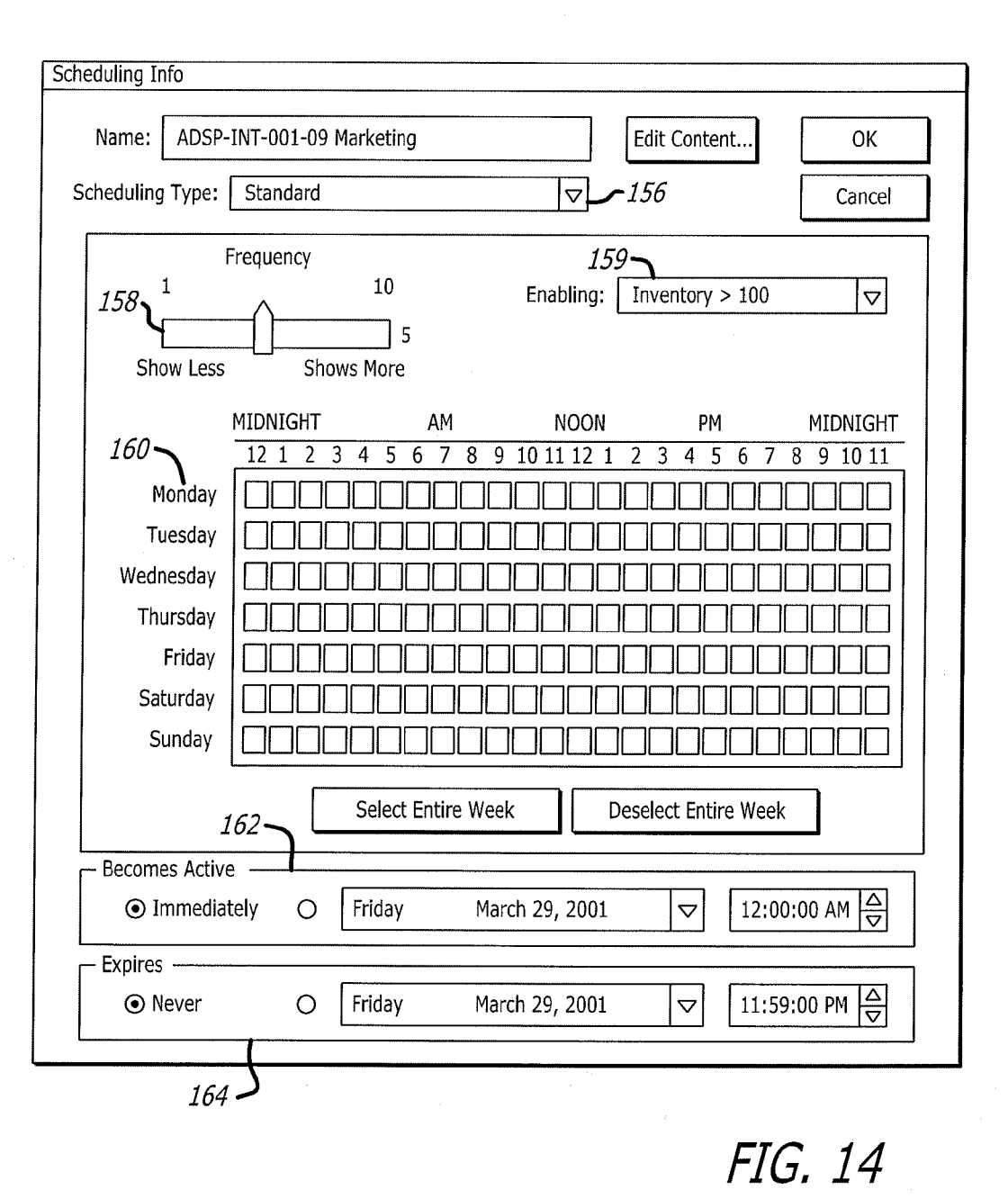

FIG. 14 shows the configuration options available for a "Standard" type schedule. To schedule an item of content with a Standard schedule, the content is selected (as previously shown in FIG. 11) and "Standard" is selected in the schedule type dropdown list (156). Configuration of a Standard schedule item is accomplished by first selecting a frequency of play (158). The item is then played at that frequency relative to other items that are available for play. However, the frequency concept is not absolute. For example, if a particular media player is said to have a frequency of 5, it does not mean that that particular media is going to play five times a minute, or once every five minutes. What it means is that it will have a frequency of play of five (5) relative to the other media. That is to say, if a particular item has a frequency of five, and another item also has a frequency of five, they will both play about the same number of times. However, if one has a frequency of five and another has a frequency of 10, then on the average, the first will play once for each two plays of the other.

Optionally, an enabling variable (159) can be selected. Basic logic can be applied to this external variable to either enable or disable the play of this content item, e.g., in this example the variable "Inventory" is controlled by an external system such as a company's inventory management system. If inventory exceeds 100 then this item is enabled for play. But if the inventory drops below 100, then this item is disabled from play until the inventory again exceeds 100.

Scheduling the day and time that the content is to be played is accomplished through a user-friendly scheduling grid (160) that allows the user to select the hours of play for each day of the week. The content item schedule (160) shows the item scheduled to play not at all on Monday, from 6 am through 7 pm Tuesday through Friday, and from 1 pm until 7 pm on Saturday and Sunday.

The final configuration items on this screen allow the user to set the date and time that the content will start playing (162) and stop playing (164). An example of where this feature would be used would include the case where an advertisement of a sale for a department store starts on Friday and runs through Sunday. If this is an in the sore advertisement, one might want this sale advertisement to begin at a particular time on the first sale day and stop running at the end of the sale period. This feature allows that to happen automatically without manual intervention at the start and stop times and dates.

Moving now to FIG. 15, "Recurring" has been selected as the schedule type (166), and a slightly different set of options are presented to the user. In the Recurring schedule screen, the frequency option shown in the Standard schedule has been replaced with Interval (168) and Offset (170) controls. Additionally, a check box labeled "Interrupt Playing Content" (172) has been added to the screen. The Interval control allows the user to determine how often the content will be played; in this case, the content will be played every 15 minutes. The offset control determines the exact time following the beginning of the selected Interval that the content will be played. In this example, the offset is 5 and the interval is set to 15 minutes, so the content will be played every hour at five minutes after the hour, twenty minutes after, thirty five minutes after and 50 after the hour; e.g., 1:05 pm, 1:20 pm, 1:35 pm, and 1:50 pm.

The final unique configuration item for the recurring schedule is the Interrupt Playing Content check box (172). If this feature is selected, the playing content will be interrupted at the time this item of content is scheduled to be played. If not selected, this content will be played at the end of the currently playing content.

Figure 16:
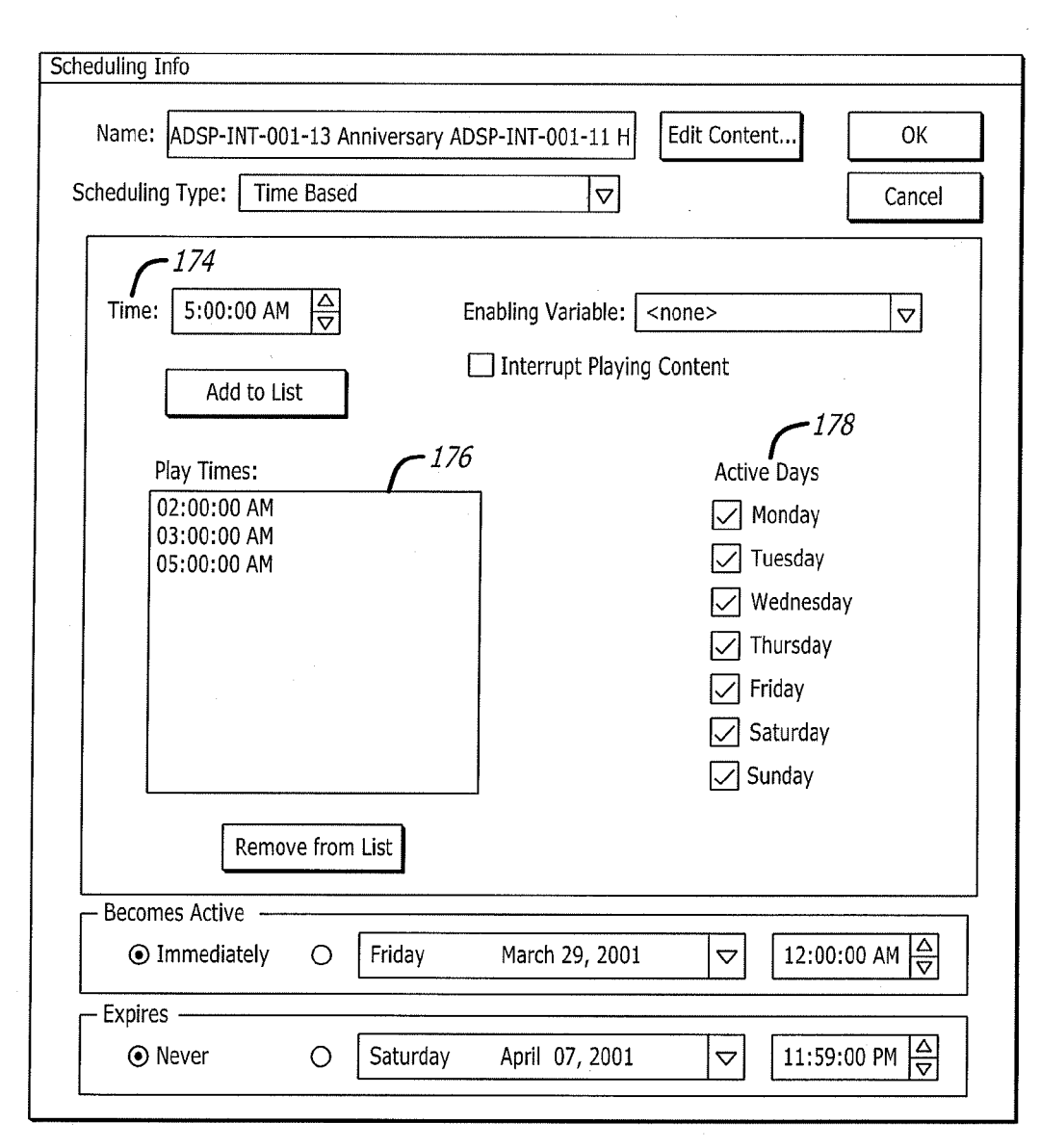

Moving now to the "Time Based" schedule screen shown in FIG. 16, this schedule type allows for the selection of specific Times for play (174). The times that this content will be played are shown in the "Play Times" box (176). Additionally, at (178) the user can select the days of the week that this content is to play by checking the "Active Days" check boxes provided for each day of the week.

Figure 17:
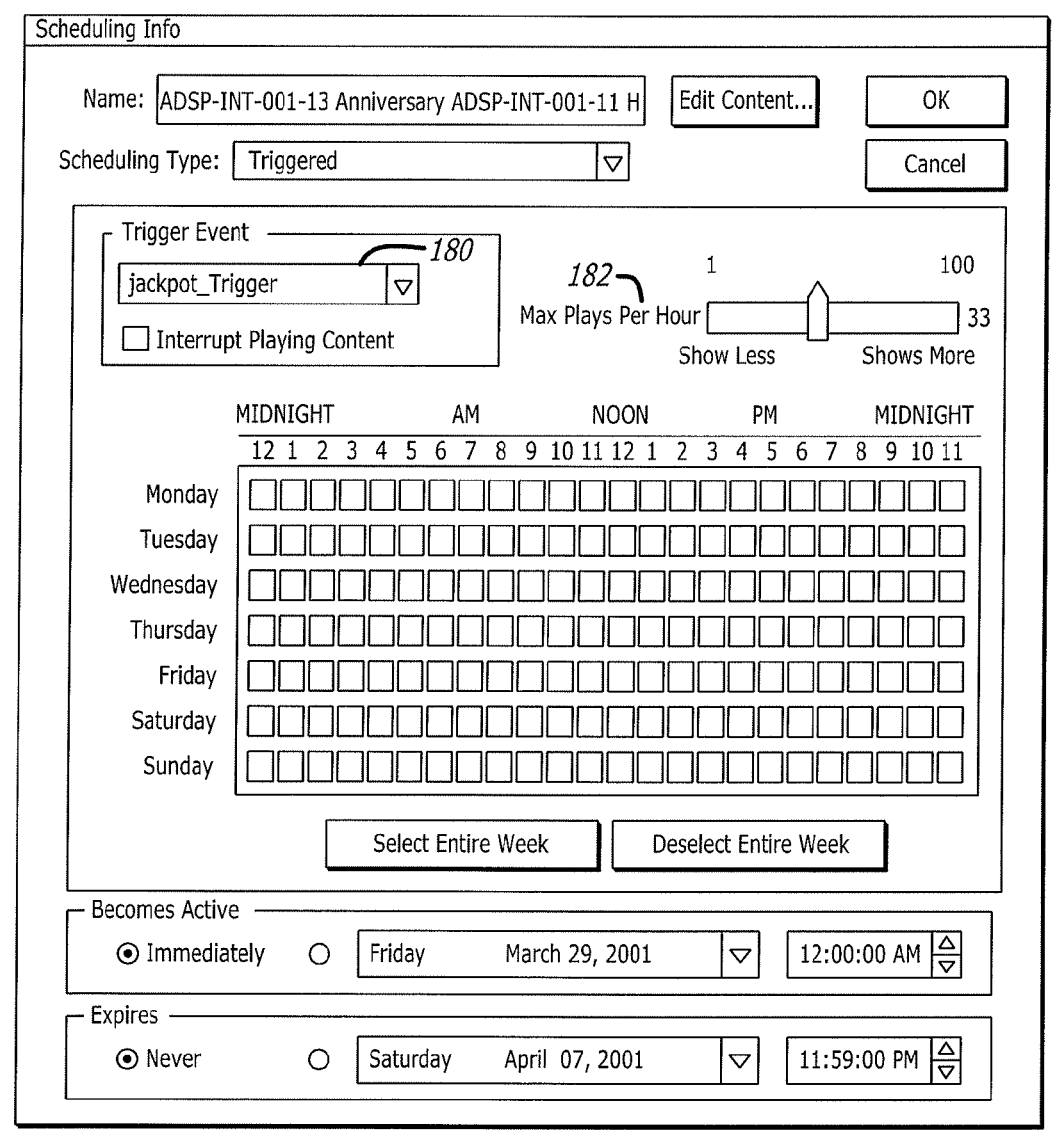

The fourth type of schedule, "Triggered", is shown in FIG. 17. In this case an external trigger called "jackpot Trigger" (180) external to the system is input and typically relates to some type of triggering event. Upon occurrence of the triggering event, a particular media content will be played. The user has the ability to limit the time per hour that this event may occur by setting the max plays per hour control (182).

The fifth element of scheduling, "Category Filtering" has been explained above with respect to FIG. 8.

Figure 18:
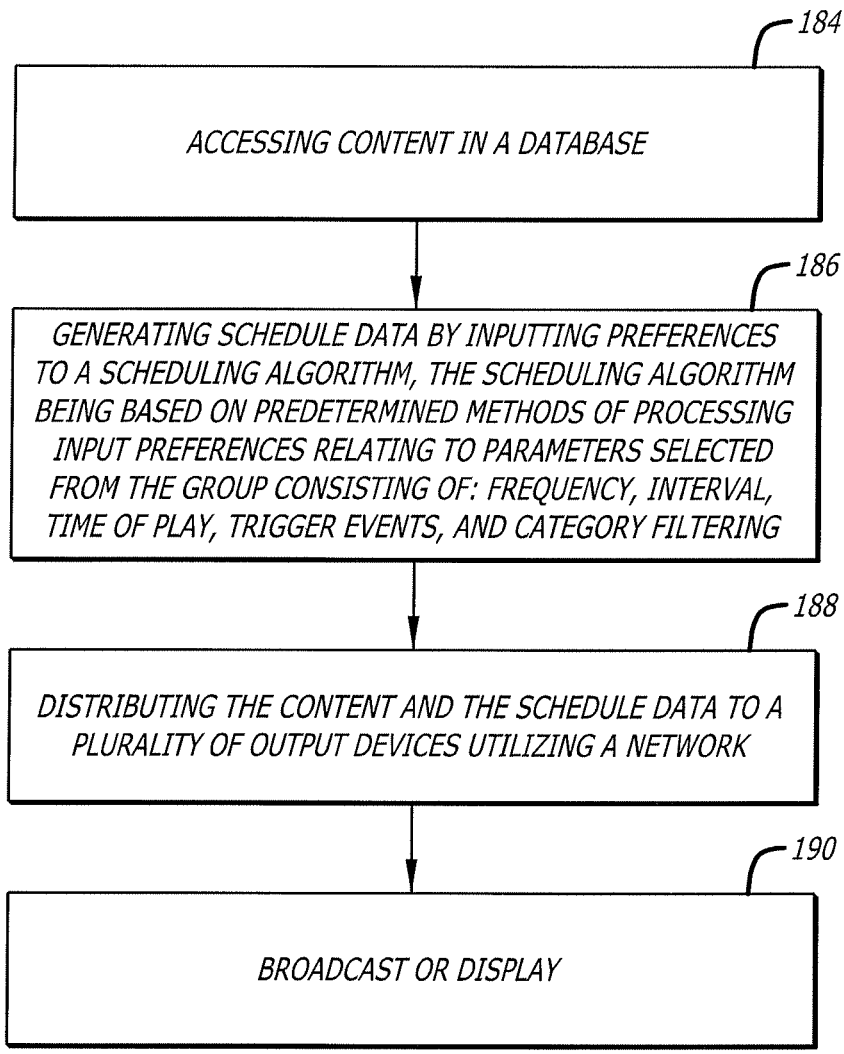
FIG. 18 is a flow diagram concisely illustrating a generalized embodiment of the invention.

FIG. 18 illustrates a flowchart of a process for scheduling the distribution of content utilizing a network in accordance with an embodiment of the present invention. In operation, content in a database is accessed (block 184), and schedule data is generated by inputting preferences to a scheduling algorithm (block 186). The scheduling algorithm is based on a combination of predetermined methods of processing input preferences relating to parameters selected from the group consisting of: frequency, interval, time of play, trigger events and category filtering. After processing, the content and the schedule data are distributed (block 188) to a plurality of output devices utilizing a network. Once distributed, the receiving output devices respond to the schedule data and cause the content to be communicated to an intended audience by an appropriate broadcast or display (block 190) as described above.

It will thus be appreciated that the present invention provides a method and system for facilitating the electronic scheduling and distribution of content for broadcast, display or playback at one or a plurality of sites or venues playing, displaying and/or broadcasting any of a variety of types of media. As described above, discrete items of content (either fixed graphic, audio or video, or any combination thereof) may be scheduled for broadcast or playback based upon a schedule created by the integration of at least five standard scheduling methods included within a single comprehensive scheduling algorithm. In the first scheduling method, a discrete item of content is assigned a frequency rating relative to other items of content. A second way to schedule is called recurring playback wherein a particular item of content is scheduled to repeat at specific intervals of time. Intervals can be in terms of minutes, hours or days. A third scheduling method allows the content to be played according to a time base; that is, media content can be scheduled to play at specific dates and times. The fourth type of input to the scheduling system is a trigger event which may be received from a source external to the scheduling system. Upon receipt of the trigger event, particular media content will be played. This type of input includes a mechanism called asynchronous request and relates to play of previously unscheduled content on an external request basis. And lastly, means are provided for selectively determining whether or not particular content is available for play in a particular venue or during a particular period of time. These five methods of scheduling playback of content are integrated into a single comprehensive scheduling system.

While the above provides a full and complete disclosure of a preferred embodiment of the invention, various modifications, alternate constructions and equivalents may be employed without departing from the true spirit and scope of the invention. For example, the present invention can be used to distribute any type of communicative content along with any type of display or restriction control instructions. Accordingly, it is intended that the above not be construed as limiting the scope of the invention, which is defined by the appended claims.

What is claimed:

1. A method for scheduling distribution of advertising content to a plurality of media devices, the method comprising:
   generating, by a hardware processor, a scheduling data structure from a database including schedule data, wherein the schedule data is based on frequency of play, predetermined time intervals, time of play, trigger events, or category filtering;
   selecting and distributing standard content via a network to the media devices located in gaming devices based on the scheduling data structure;
   determining whether there is non-standard non-interrupting content to be played in a priority queue that takes priority over the standard content;
   determining whether there is non-standard interrupting content to be played that takes priority over the standard content and the non-standard non-interrupting content;
   dynamically presenting the non-standard non-interrupting content in the priority queue before the standard content without interrupting the standard content and removing the non-standard non-interrupting content from the priority queue after being presented when it is determined that there is no non-standard interrupting content to be played;
   dynamically presenting the non-standard interrupting content before starting or finishing presentation of standard content or non-standard non-interrupting content when it is determined that there is non-standard interrupting content to be played;
   dynamically presenting the standard content when it is determined that there is no non-standard non-interrupting content and non-standard interrupting content to be played; and
   updating the scheduling data structure in response to updates to the database.

2. The method of claim 1, wherein each media device includes a display and a media controller for receiving content.

3. The method of claim 1, wherein the content is dynamically presented on display screens.

4. The method of claim 1, further comprising saving the scheduling data structure on a first memory device.

5. The method of claim 4, further comprising:
   replicating the scheduling data structure; and
   saving the scheduling data structure on a second memory device that is separate and distinct from the first memory device.

6. The method of claim 1, further comprising integrating data streams of content of corporate information or internet data from disparate sources into standard content.

7. The method of claim 1, wherein the non-interrupting content in the priority queue is advertising content.

8. A method for managing media content presented on plurality of networked devices, the method comprising:
   generating, by a hardware processor, a database of media content including standard items and interrupting items;
   generating a schedule for presenting the standard items, the schedule being based on based on frequency of play, interval, time of play, trigger events, or category filtering;
   processing external scheduling input in view of the schedule;
   distributing the media content via a network to the plurality of networked devices wherein non-standard non-interrupting content takes priority over standard content, and wherein non-standard interrupting content takes priority over standard content and non-standard non-interrupting content;
   dynamically presenting non-standard non-interrupting content in a priority queue before standard content without interrupting the standard content when it is determined that there is no non-standard interrupting content to be played;
   dynamically presenting the non-standard interrupting content before starting or finishing presentation of standard content or non-standard non-interrupting content when it is determined that there is non-standard interrupting content to be played; and
   dynamically presenting the standard content when it is determined that there is no non-standard non-interrupting content and non-standard interrupting content to be played.

9. The method of claim 8, wherein the items are dynamically presented on display screens.

10. The method of claim 8, further comprising saving the schedule on a first memory device.

11. The method of claim 10, further comprising:
    replicating the schedule; and
    saving the schedule on a second memory device that is separate and distinct from the first memory device.

12. The method of claim 8, wherein generating the database of media content further comprises integrating data streams of content of corporate information or internet data from disparate sources into media content.

13. The method of claim 8, further comprising updating the scheduling data structure in response to updates to the database.

14. The method of claim 8, further comprising distributing the schedule via the network to the plurality of networked device.

15. A system for dynamically presenting content to a plurality of devices, comprising:
    at least one hardware processor;
    a plurality of media players in communication with a network;

a data network for receiving media content from one or more sources including a wide area network, a scheduler workstation, or a web gateway;

a schedule database for storing scheduling data, wherein the scheduling data is based on frequency of play, interval, time of play, trigger events, or category filtering; and a server for executing a schedule for dynamically presenting the media content, wherein the schedule is based on the scheduling data, wherein the media content includes standard content, non-standard non-interrupting content that takes priority over standard content, and non-standard interrupting content that takes priority over standard content and non-standard non-interrupting content;

wherein non-standard non-interrupting content in a priority queue is dynamically presented before standard content without interrupting the standard content, wherein non-standard interrupting content is dynamically presented before starting or finishing presentation of standard content or non-standard non-interrupting content, and wherein standard content is then dynamically presented.

16. The system of claim 15, wherein the remote media players comprise a display and a controller.

17. The system of claim 15, wherein the remote media players are located in gaming devices.

18. The system of claim 15, wherein the server includes an arbiter to identify scheduling conflicts and prioritize scheduling of media content.

19. The method of claim 8, wherein the interrupting items are advertising content.

* * * * *

UNITED STATES PATENT AND TRADEMARK OFFICE
CERTIFICATE OF CORRECTION

| | | |
|---|---|---|
| PATENT NO. | : 8,719,328 B2 | Page 1 of 1 |
| APPLICATION NO. | : 12/424365 | |
| DATED | : May 6, 2014 | |
| INVENTOR(S) | : Louis Giacalone, Jr. | |

It is certified that error appears in the above-identified patent and that said Letters Patent is hereby corrected as shown below:

In the Specification

Column 11, Line 65, Change "sore" to --store--

Signed and Sealed this
Twenty-third Day of September, 2014

Michelle K. Lee
*Deputy Director of the United States Patent and Trademark Office*